United States Patent
Wells et al.

(10) Patent No.: US 11,482,141 B1
(45) Date of Patent: Oct. 25, 2022

(54) RETICLE AND TARGET BASED CALIBRATION FOR AUGMENTED REALITY HEAD-UP DISPLAYS

(71) Applicant: GM GLOBAL TECHNOLOGY OPERATIONS LLC, Detroit, MI (US)

(72) Inventors: James W. Wells, Rochester Hills, MI (US); Henrique Barbosa Nestal, Macomb, MI (US); Paul Andrew Gallo, Orchard Lake, MI (US); Roberto Damico, Canton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/388,667

(22) Filed: Jul. 29, 2021

(51) Int. Cl.
*G09G 3/00* (2006.01)
*G02B 27/01* (2006.01)
*G02B 27/00* (2006.01)
*B60K 35/00* (2006.01)
*G06F 3/01* (2006.01)

(52) U.S. Cl.
CPC ............. *G09G 3/002* (2013.01); *B60K 35/00* (2013.01); *G02B 27/0093* (2013.01); *G02B 27/0101* (2013.01); *G06F 3/013* (2013.01); *B60K 2370/126* (2019.05); *B60K 2370/149* (2019.05); *B60K 2370/1529* (2019.05); *G02B 2027/014* (2013.01); *G09G 2320/0606* (2013.01); *G09G 2320/0693* (2013.01); *G09G 2340/045* (2013.01); *G09G 2340/0464* (2013.01); *G09G 2340/0492* (2013.01); *G09G 2354/00* (2013.01); *G09G 2380/10* (2013.01)

(58) Field of Classification Search
CPC ........... G09G 3/002; G09G 2320/0606; G09G 2320/0693; G09G 2340/045; G09G 2340/0464; G09G 2340/0492; G09G 2354/00; G09G 2380/10; B60K 35/00; B60K 2370/126; B60K 2370/149; B60K 2370/1529; G02B 27/0093; G02B 27/0101; G02B 2027/014; G06F 3/013
See application file for complete search history.

(56) References Cited

U.S. PATENT DOCUMENTS

| | | | |
|---|---|---|---|
| 9,075,563 B2 * | 7/2015 | Kim | G01C 21/365 |
| 10,996,481 B1 | 5/2021 | Wells et al. | |
| 2010/0198506 A1 * | 8/2010 | Neilhouse | G01C 21/365 |
| | | | 701/532 |
| 2019/0011983 A1 * | 1/2019 | Yasuda | G06F 3/04842 |
| 2021/0157135 A1 | 5/2021 | Wells et al. | |

* cited by examiner

*Primary Examiner* — Brent D Castiaux

(57) ABSTRACT

A HUD calibration system is provided and includes a HUD, a reticle reference object, a target, and a control module. The HUD displays a virtual image including a first center feature and first features. The reticle reference object is physically fixed to a windshield of a vehicle. The target is physically disposed forward of the vehicle and includes a second center feature and second features. The control module: controls the HUD to display the virtual image superimposed over the target; perform a boresighting process to align a center of a cross-hair of the reticle reference object with the first and second center features and generate first reference values; perform an undistortion calibration process to rotate and undistort the virtual image relative to the target and generate second reference values; and adjust operation of the HUD based on the first and second reference values.

20 Claims, 9 Drawing Sheets

RETICLE AND TARGET BASED CALIBRATION FOR AUGMENTED REALITY HEAD-UP DISPLAYS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to head-up displays (HUDs).

A HUD can be used within a vehicle to project various information including vehicle parameter and status information, environment information, navigation information, infotainment information, etc. A HUD can include an image generator, projection devices (e.g., optics, mirrors, etc.) and a combiner. As an example, the combiner may be implemented as a windshield of a vehicle. The image generator outputs a light beam to projection devices, which then reflect the light beam to the combiner. The light beam includes an image that is sized, flipped, positioned and/or reflected by the windshield. The windshield serves as a reflector by which the image is visible to a driver of the vehicle as a virtual image, which is perceived by the driver as being shown within an environment forward of the vehicle.

SUMMARY

A head-up display calibration system is provided and includes a head-up display, a reticle reference object, a target, and a control module. The head-up display is configured to display a first virtual image, the first virtual image including a first center feature and first features surrounding the first center feature. The reticle reference object is physically fixed to a windshield of a vehicle. The target is physically disposed forward of the vehicle and including a second center feature and second features surrounding the second center feature. The control module is configured to: control the head-up display to display the first virtual image superimposed over the target as viewed from a driver seat of the vehicle; perform a boresighting process to align a center of a first cross-hair of the reticle reference object with the first center feature and the second center feature and generate first reference values; perform at least one undistortion calibration process to rotate and undistort the first virtual image relative to the target, such that the second features are positioned over respective ones of the first features and generate second reference values; and adjust operation of the head-up display based on the first reference values and the second reference values.

In other features, the control module is configured to: generate a signal to indicate to a user of the head-up display calibration system to adjust location of eyes of the user to align the center of the first cross-hair of the reticle reference object with the second center feature of the target; and receive inputs indicating the center of the first cross-hair of the reticle reference object is aligned with the second center feature of the target.

In other features, the control module is configured to: receive inputs to move the first virtual image relative to the target; receive an input indicating the center of the first cross-hair of the reticle reference object is aligned with the second center feature of the target and the first center feature of the first virtual image; and set the first reference values based on a last location of the first virtual image.

In other features, the control module is configured to: receive inputs to rotate and adjust size of first virtual image; rotate and adjust size of first virtual inputs based on the inputs relative to target; and set the second reference values based on resultant locations of the second features relative to the first features.

In other features, the reticle reference object includes cross-hairs respectively for undistortion calibrations and corresponding gaze perspectives. The cross-hairs include the first cross-hair. The control module is configured to perform the undistortion calibrations to generate the second reference values.

In other features, the control module is configured to: generate a signal indicating performance of three undistortion calibrations for high, middle and low eye height locations within an eyebox; receive inputs to adjust the first virtual image relative to the target for each of the three undistortion calibrations; and set the second reference values based on results of the three undistortion calibrations.

In other features, the control module is configured to during each of the three undistortion calibrations at least one of rotate and/or adjust size of the first virtual image.

In other features, the head-up display is configured to display a second virtual image. The second virtual image displayed closer to the vehicle than the first virtual image. The first virtual image is displayed over and in alignment with one or more objects in a field of view of a driver of the vehicle. The second virtual image is not displayed in alignment with an object in the field of view.

In other features, a virtual image display system is provided and includes: the head-up display calibration system; a driver monitoring system configured to determine at least one of a height or location of an eye of a driver; and an inertial measurement module configured to generate an output signal. The control module is configured to display a second virtual image based on the first reference values the second reference values, at least one of the height or the location of a driver eye, and the output signal from the inertial measurement module.

In other features, the control module is configured to: determine a location of an object forward of the vehicle; and based on the first reference values and the second reference values, display a second virtual image over and in alignment with the object.

In other features, a head-up display calibration method is provided and includes: obtaining location data for a reticle reference object physically fixed to a windshield of a vehicle; obtaining location data for a target physically disposed forward of the vehicle and including a first center feature and first features surrounding the first center feature; controlling a head-up display of the vehicle to display a first virtual image superimposed over the target as viewed from a driver seat of the vehicle, the first virtual image including a second center feature and second features surrounding the second center feature; performing a boresighting process to align a center of a first cross-hair of the reticle reference object with the first center feature and the second center feature and generate first reference values; performing at least one undistortion calibration process to rotate and undistort the first virtual image relative to the target, such that the second features are positioned over respective ones of the first features and generate second reference values; and adjusting operation of the head-up display based on the first reference values and the second reference values.

In other features, the method further includes: generating a signal to indicate to a user of the head-up display calibration system to adjust location of eyes of the user to align the center of the first cross-hair of the reticle reference object with the first center feature of the target; and receiving inputs indicating the center of the first cross-hair of the reticle reference object is aligned with the first center feature of the target.

In other features, the method further includes: receiving inputs to move the first virtual image relative to the target; receiving an input indicating the center of the first cross-hair of the reticle reference object is aligned with the first center feature of the target and the second center feature of the first virtual image; and setting the first reference values based on a last location of the first virtual image.

In other features, the method further includes: receiving inputs to rotate and adjust size of first virtual image; rotating and adjusting size of first virtual inputs based on the inputs relative to target; and setting the second reference values based on resultant locations of the second features relative to the first features.

In other features, the method further includes performing three undistortion calibrations to generate the second reference values. The reticle reference object includes three cross-hairs respectively for the three undistortion calibrations.

In other features, the method further includes: generating a signal indicating performance of three undistortion calibrations for high, middle and low eye height locations within an eyebox; receiving inputs to adjust the first virtual image relative to the target for each of the three undistortion calibrations; and setting the second reference values based on results of the three undistortion calibrations.

In other features, the method further includes during each of the three undistortion calibrations at least one of rotating and/or adjusting size of the first virtual image.

In other features, the method further includes displaying a second virtual image on the head-up display closer to the vehicle than the first virtual image. The first virtual image is displayed over and in alignment with one or more objects in a field of view of a driver of the vehicle. The second virtual image is not displayed in alignment with an object in the field of view.

In other features, the method further includes: determining at least one of a height or location of an eye of a driver; generating via an inertial measurement module an output signal; and displaying a second virtual image based on the first reference values the second reference values, at least one of the height or the location of a driver eye, and the output signal from the inertial measurement module.

In other features, the method further includes: determining a location of an object forward of the vehicle; and based on the first reference values and the second reference values, displaying a second virtual image over and in alignment with the object.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A HUD may generate near and far virtual images that are displayed to a driver via a windshield of a host vehicle. The near virtual images may be used to provide certain vehicle status information (or parameters) and/other information, such as vehicle speed, lane departure information, warning indications, radio stations, outside temperature, etc. The far virtual images may include features that are displayed on, overlapping with and/or aligned with objects in an environment forward of the host vehicle and in a FOV of a driver to provide an enhanced augmented reality.

Figure 1:
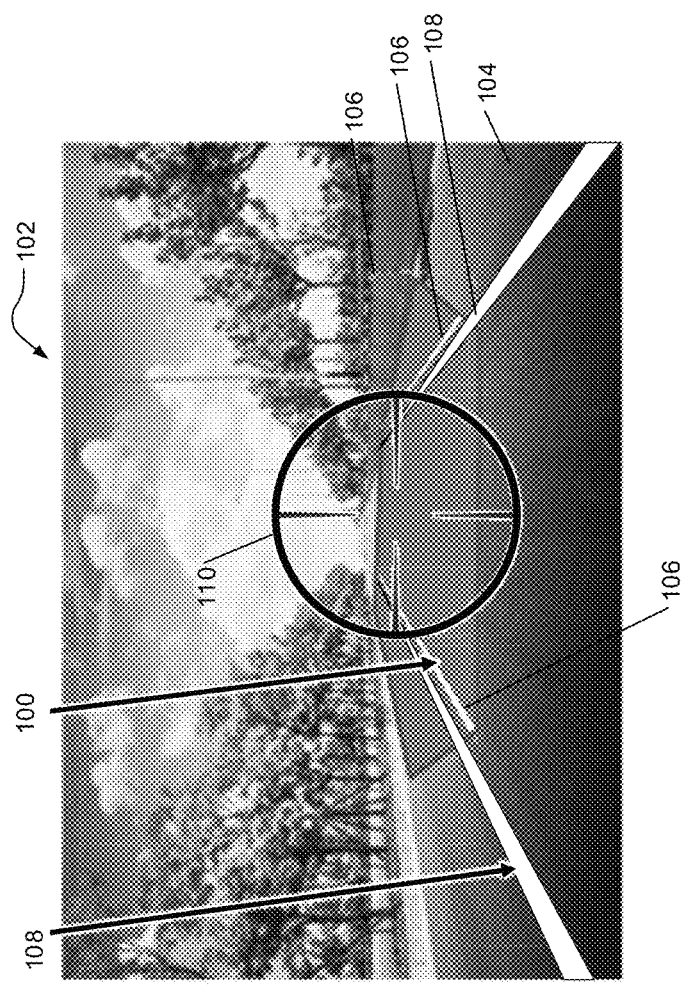
FIG. 1 is an example illustration of a far virtual image aligned with objects in a field-of-view (FOV)
Figure 1:
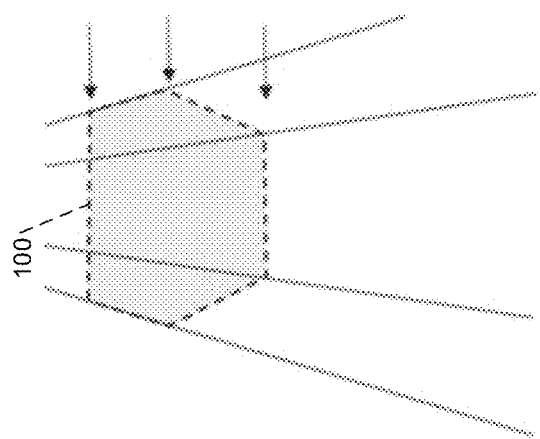
Figure 2:
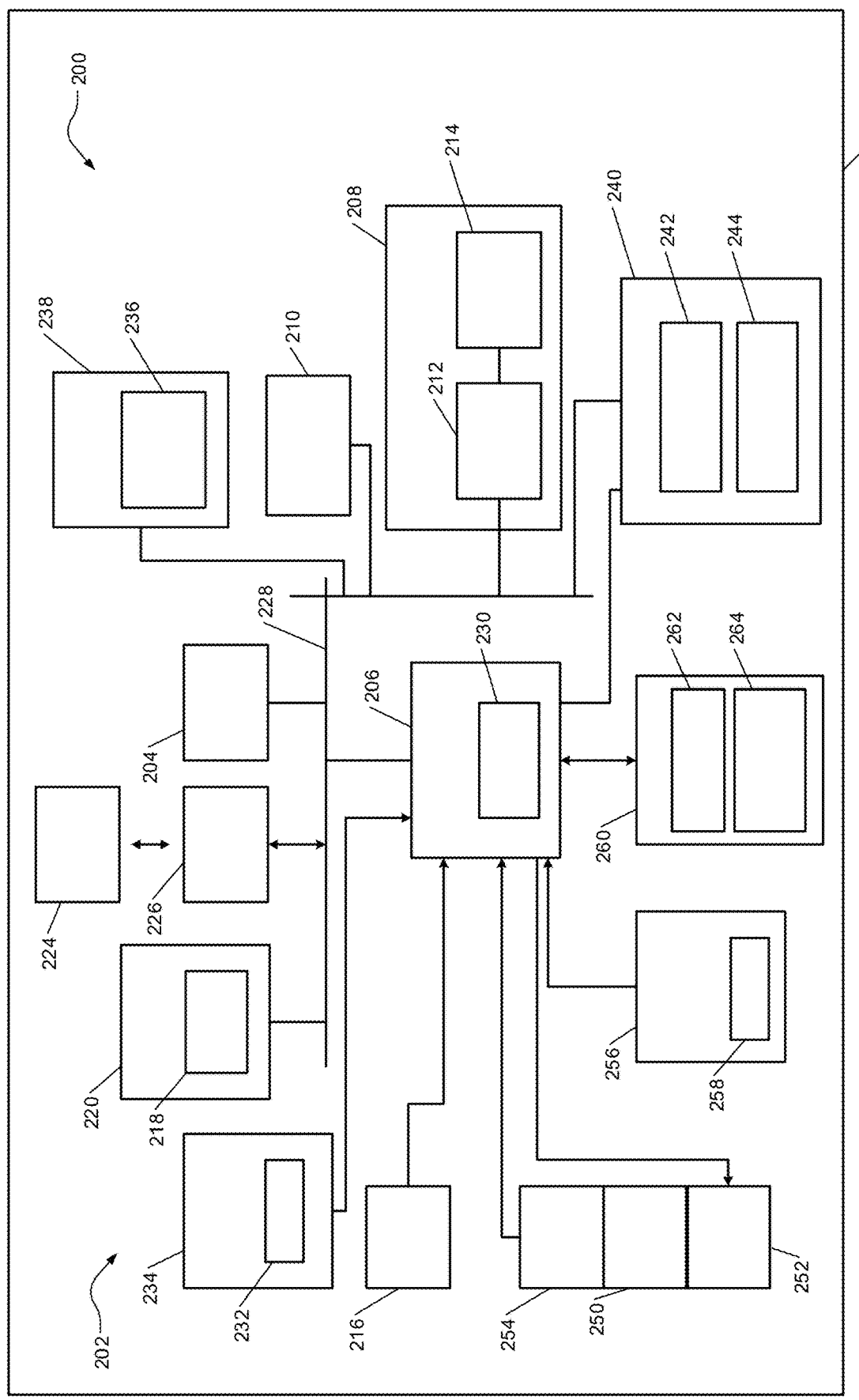
FIG. 2 is a functional block diagram of an example virtual image display system including a calibration system for calibrating a HUD in accordance with the present disclosure.

FIG. 1 shows an example far virtual image 100 aligned with objects in a FOV 102. The far virtual image 100 is shown over a road surface 104 forward of a host vehicle and includes features (markings) 106 aligned with the road surface 104 and lane markings 108 on the road surface 104. The far virtual image 100, as shown, also includes a scope 110 indicating a direction of travel. The far virtual image 100 is provided as an example; various other far virtual images may be displayed. In order for the far virtual image 100 to coincide with an environment and be sized appropriately, the corresponding HUD highly magnifies the far virtual image 100. As an example, the HUD may magnify the far virtual image 100 thirty times (30×). This is unlike a near virtual image (not shown in FIG. 1), which is typically magnified 2.5-5×. The near virtual image may be displayed to be perceived by the driver as being, for example, 2.3 meters (m) forward of the host vehicle. The far virtual image 100 may be displayed to be perceived by the driver as being, for example, 10-100 meters (m) forward of the host vehicle. Alignment of graphics of the far virtual image with objects in the FOV 102 may be based on information collected from a driver monitoring system (DMS) and/or an inertial measurement module (also referred to as an inertial measurement unit), examples of which are shown in FIG. 2.

Display of far virtual images requires precise alignment of the far virtual images relative to objects in an environment.

In order to enable precise far virtual image placement, the corresponding display system must be calibrated. The perceived (or virtual) location of the far virtual image can change significantly when, for example, a physical location of the HUD relative to a physical location of a windshield changes. This "throws off" the calibration, such that the far virtual images are distorted and/or misaligned.

The physical relationship between the HUD and the windshield can change, when for example, the windshield and/or HUD is replaced and/or when the HUD is moved relative to the windshield. This may occur, for example, due to a crack in the windshield and/or service being performed on the HUD. Due to the mounting location of a HUD, which is typically within a front console behind an instrument panel of a vehicle and depending on the vehicle design, the most efficient manner of removing and servicing the HUD might require the removal of the windshield. The HUD is then removed through the opening created by removal of the windshield in an area between the A-pillars of the vehicle. Removal and replacement of the instrument panel and/or HUD can change the location and angle of the HUD relative to the windshield.

A change in physical relationship between the windshield and the HUD results in far virtual images being distorted and/or not being aligned with objects in an environment forward of the vehicle. The term "distorted" as used herein refers to a far virtual image being warped and/or not sized appropriately for the virtual environment location at which the far virtual image is to be displayed. In order to correct this distortion and misalignment, the HUD needs to be recalibrated.

The examples set forth herein includes a calibration system for easy and efficient recalibration of a HUD to compensate for misalignment and distortion. This recalibration may be performed, for example, by a service technician at a service station. The calibration system allows for recalibration without need for direct access to the HUD and without need for one or more cameras and/or robots to be placed within the vehicle. During manufacturing of a vehicle, a camera may be located within the vehicle and be moved via a robot. The camera may be located in an eyebox region forward of a head restraint of a driver seat and used to perform an initial automated calibration of the HUD. The calibration process disclosed herein does not utilize an externally supplied camera and/or robot.

The disclosed calibration system enables effective user graphical interaction for augmented reality (AR) HUD calibration including far virtual image location, rotation, and distortion correction. The examples disclosed herein also allow an operator (or service technician) to correct an out of calibration far virtual image without need of manually tuning numerous parameters. The examples provide a reliable and accurate process that allows a technician to evaluate, center, and undistort far virtual images via a user interface to recalibrate a HUD. In one embodiment, a service tool is connected to a host vehicle and used as a user interface to provide commands and/or corrections to a vehicle onboard control module. In another embodiment, the technician performs the recalibration using input devices of the vehicle, such as switches, dials, displays, etc. on a steering wheel, a center console, an instrument panel, etc. The examples provide a low cost calibration solution that is able to be used under a variety of field conditions both indoors and outdoors.

Figure 3:
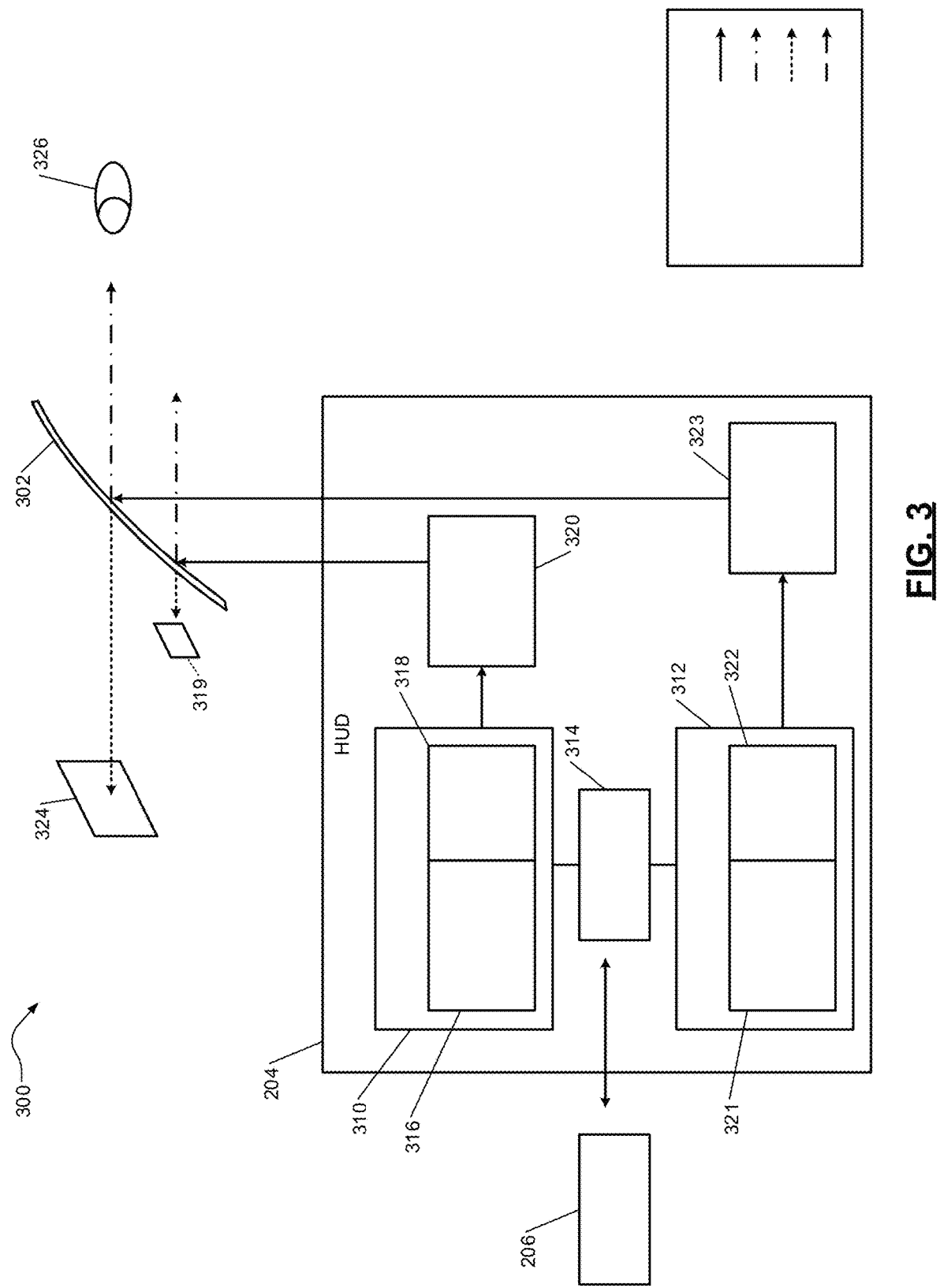
FIG. 3 is functional block diagram of an example portion of the virtual image display system in accordance with the present disclosure.

FIG. 2 shows a virtual image display system 200 of a vehicle 201. The virtual image display system 200 includes a calibration system 202 for calibrating a HUD 204 and a vehicle control module 206, a DMS 208, an inertial measurement module 210. Although the below disclosure is primarily described with respect to the HUD 204, the examples set forth herein are applicable to other reflective vehicle displays. The DMS 208 may include a DMS module 212 and a camera 214. The DMS 208 may determine heights and locations (or coordinates) of eyes of a driver. The inertial measurement module 210 may determine, for example, force, angular rate, and/or orientation of the vehicle 201. The HUD 204 may display far virtual images based on parameters determined by the DMS module 212, the inertial measurement module 210, sensors 216 (e.g., object detection sensors and vehicle speed sensor), global positioning system (GPS) 218, etc. The GPS 218 may be part of a navigation system 220. The vehicle control module 206 and/or other module of the vehicle 201 may monitor an environment forward of the vehicle 201 and display far virtual images via a windshield (an example windshield is shown in FIG. 3) to provide an enhanced augmented reality for a driver of the vehicle 201.

The calibration system 202 may include the HUD 204, the vehicle control module 206 and one or more input devices. The input devices are used by, for example, a technician to interface with the vehicle control module 206 and/or the HUD 204. In one embodiment, a service tool 224 may be used as a user interface and be connected to a diagnostic interface connector 226 (also referred to as an onboard diagnostic connector), which may be connected to a bus 228. The service tool 224 may be used to download corrections and/or to provide inputs for alignment and undistortion operations. The bus 228 may be connected to the vehicle control module 206. As an example, the service tool 224 may be implemented as a laptop computer and include calibration software executed when communicating with the vehicle control module 206 and/or the HUD 204 and calibrating the HUD 204. In another embodiment, calibration of the HUD 204 is performed without use of the service tool.

The vehicle control module 206 may include a calibration module 230. The calibration module 230 may include a calibration program executed by the vehicle control module 206 to calibrate the HUD 204. The service tool 224 may instruct the vehicle control module 206 to execute the calibration program or the calibration program may be initiated via an input device located within the vehicle. Example input devices include switches 232 on a steering wheel 234, a display 236 of an infotainment system 238, and/or other interface devices 240, such as input devices 242 on a dashboard and/or input devices 244 on a center console. The display 236 may be in various locations in the vehicle, such as in the dashboard. Any of the input devices may be used to receive inputs from a technician during execution of the calibration program and during calibration of the HUD 204.

The calibration system 202 may further include a driver seat 250 and corresponding seat motors 252 and seat switches 254. The seat motors 252 and seat switches 254 may be actuated when a technician is adjusting the locations of his/her eyes within the vehicle during calibration. This is explained in further detail below.

The virtual image display system 200 may further include a near virtual image manual controller 256 including switches 258. The switches 258 may be used, for example, to adjust the height of a near virtual image being displayed by the HUD 204. As an example, the manual controller 256 may be located on a dashboard of the vehicle and include a switch that when toggled moves the virtual image up or down relative to the driver. This allows the driver to place the virtual image at the appropriate height to be visible to the driver. The height of the near virtual image depends on a height of the eyes of the driver when seated in the driver seat.

A manual controller is not provided for far virtual images, for which heights of the far virtual images are automatically determined by the vehicle control module 206 and/or the HUD 204 based on objects forward of the vehicle 201 and calibration data and reference data stored in memory 260. The memory 260 may be directly connected to the vehicle control module 206 as shown, to the bus 228, or to the HUD 204 and be accessible to the vehicle control module 206 and the HUD 204. The calibration data may include, for example, boresighting data 262 and far image calibration data 264. The boresighting data 262 may include virtual coordinates of a center feature of a far virtual image, coordinates and/or heights of a user's eyes, coordinates of one or more reticles and/or reticle cross-hairs, and/or other boresighting related data. The far image calibration data 264 may include coordinates of features of a far virtual image. Example far virtual image features are described below and shown in FIGS. 4, 6, 7A and 7B.

FIG. 3 shows a portion 300 of the virtual image display system 200 of FIG. 2. The portion 300 includes HUD 204, the vehicle control module 206 and a windshield 302. The HUD 204 may include a near image generating module 310, a far image generating module 312 and a HUD control module 314, which may be connected directly or indirectly to the vehicle control module 206. The near image generating module 310 may include a first light source 316 and display and lens assembly 318. The first light source 316 may generate a near virtual image having graphics. The near virtual image is directed to the windshield 302 via near image transfer and modification devices 320 and reflected off the windshield to provide a near virtual image, which is shown in a near virtual image plane 319. The near image transfer and modification devices 320 may include reflectors, actuators, mirrors, light and glare traps, etc.

The far image generating module 312 may include a second light source 321 and display and lens assembly 322. The second light source 321 may generate a far virtual image having graphics. The far virtual image is directed to the windshield 302 via far image transfer and modification devices 323 and reflected off the windshield to provide a far virtual image, which is shown in a far virtual image plane 324. The far image transfer and modification devices 323 may include reflectors, actuators, mirrors, light and glare traps, etc. The HUD device may also combine the generation of the near and far field images in a single image generation element that are then split between their respective optics and then reflected back from different regions of the windshield surface, which acts as an image combiner.

The near virtual image and the far virtual image are seen by the eyes of a driver (one eye 326 is shown). The HUD control module 314 may control the light sources 316, 321 and actuation of, for example, reflectors of the image transfer and modification devices 320, 323.

Figure 4:
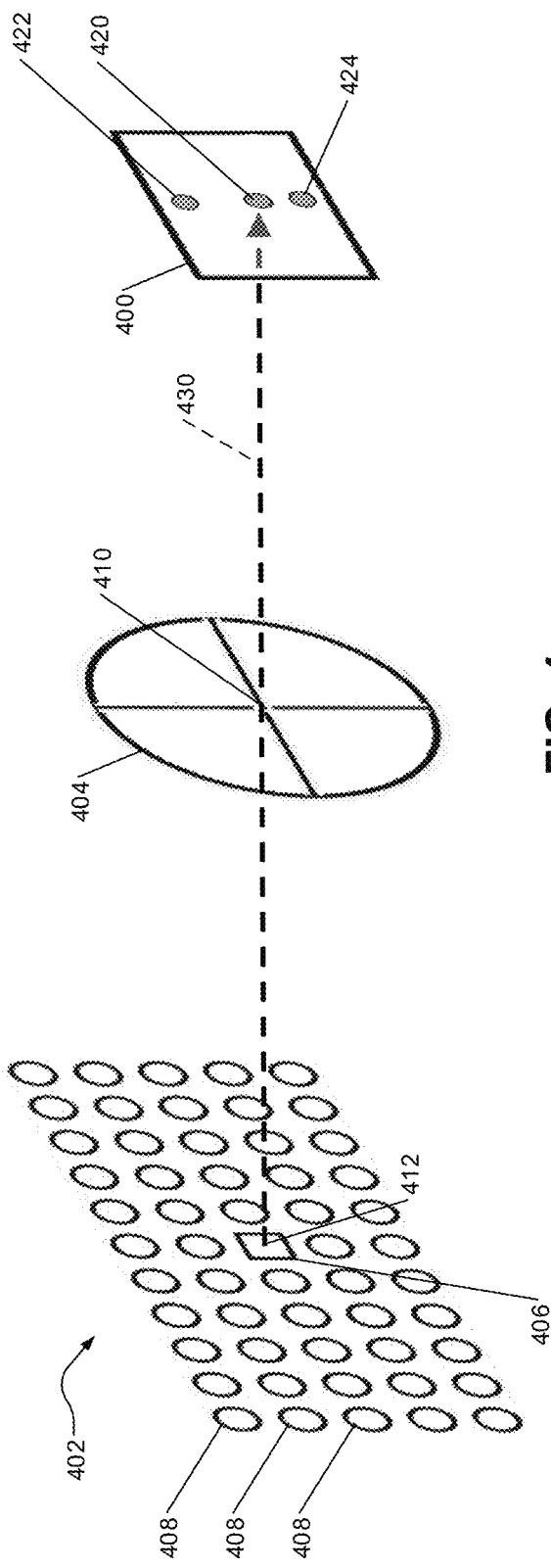
FIG. 4 is a diagram illustrating an example eyebox, a reticle and a target in accordance with the present disclosure.
Figure 6:
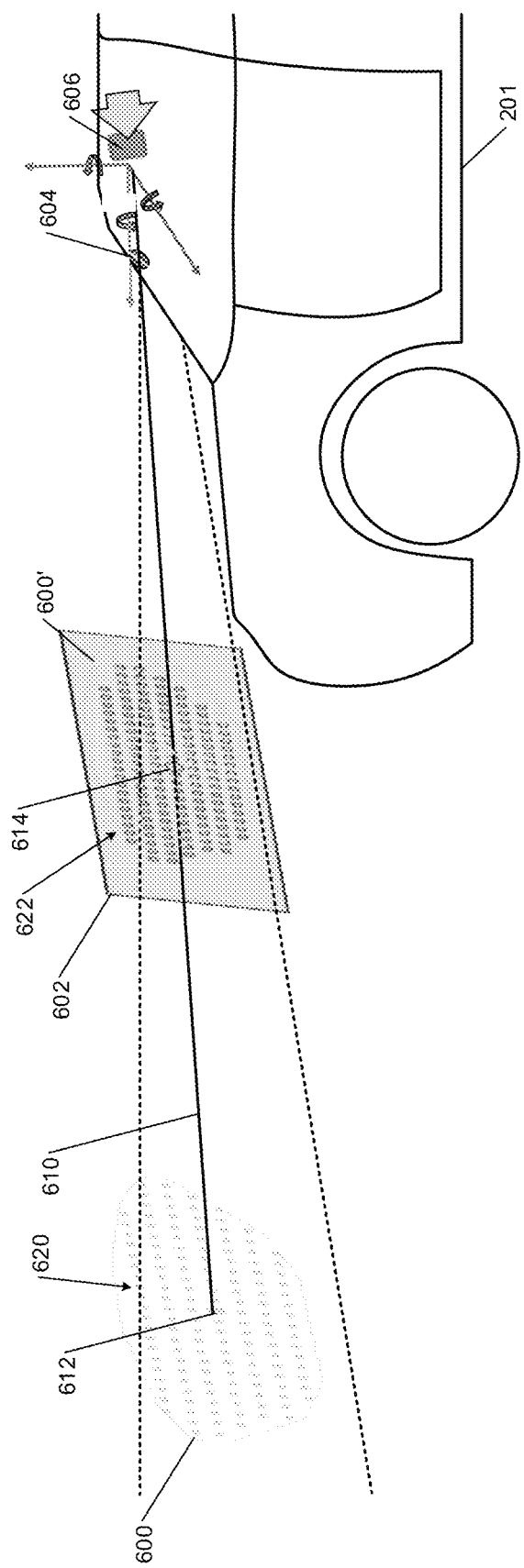
FIG. 6 is a side view of an environment of a vehicle illustrating relationships between a far virtual image, a target, a reticle reference object and a volume in which an eyebox may be located in accordance with the present disclosure.

FIG. 4 shows an eyebox 400, a target 402 and a reticle 404. The eyebox 400 may refer to a virtual box within a driver's eyes may be located in order to see the virtual images being displayed by a HUD. As an example, the eyebox may be 130 millimeters (mm) by 100 mm in size. The eyebox may be associated with more than one driver, where the drivers may have same and/or different overall body heights. The target 402 is provided as an example and includes a center feature 406, shown as a box, and surrounding features (some of which are designated 408), shown as circles. The surrounding features may be arranged in a predetermined pattern around the center feature 406. Although a particular pattern of features is shown, other patterns may be used. Also, although the features are shown as a square and circles, other features may be included having different shapes, sizes, etc. Also, although a particular number of features are shown, a different number of features may be included. Other examples are shown in FIGS. 6-7B.

As further described below, a reticle, such as the reticle 404 is physically placed on and fixed to a windshield during the below calibration process of FIGS. 8A-8B. In addition, a target, such as the target 402, is physically positioned forward of the vehicle. The reticle 404 may include a cross-hair and corresponding circle with a center point 410 that may be aligned with a center 412 of the center feature 406, as further described below. During boresighting, a user's eyes at a nominal (or middle) height are aligned with the center point 410 and the center 412 of the center feature 406. The nominal height (or location) is represented by a first circle 420, which is in the eyebox 400. When aligned, a line 430 passes through the centerpoint 410, the center 412, and the circle 420, as shown. A high eye height is represented by a second circle 422 and a low eye height is represented by a third circle 424. While 3 locations are shown in this example, this technique could be utilized with any practical number of viewing locations within the eyebox that happen to need a calibration to be performed at that location.

Subsequent to boresighting, undistortion calibrations are performed during the below described calibration process at each of the high, middle (or nominal), and low eye heights. The user (or technician) performing the calibration, moves his/her eyes to the different eye heights in order for the undistortion calibrations to be performed. This may include the user changing posture, head position, seat position, etc. to vertically adjust physical locations of the user's eyes to one of the locations, represented by the circles 420, 422, 424.

Figure 5:
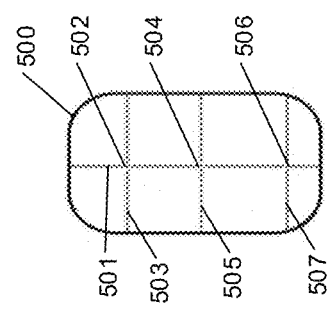
FIG. 5 is a front view of an example of a tri-reticle reference object in accordance with the present disclosure.
Figure 8A:
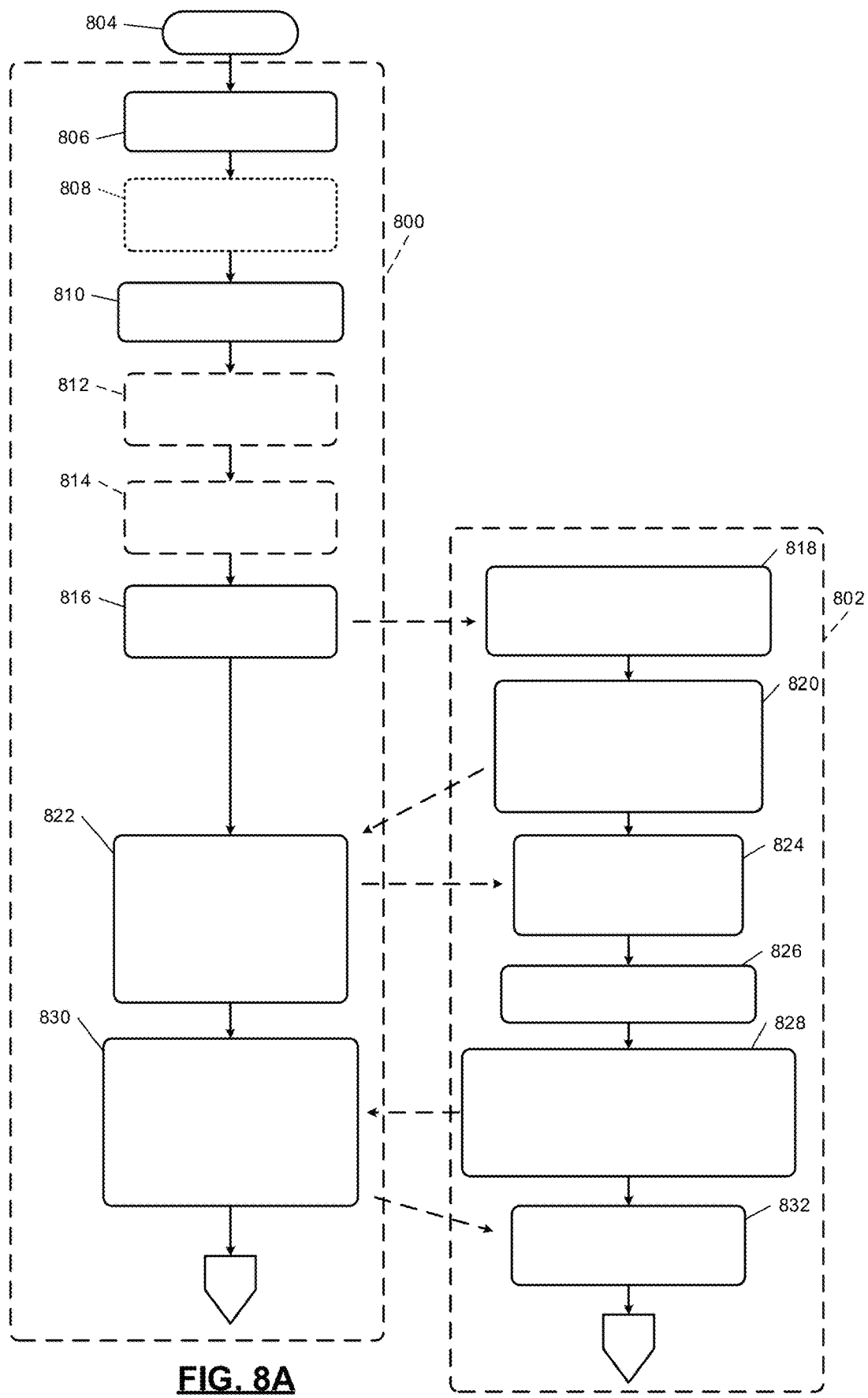
FIGS. 8A and 8B illustrates a calibration method for calibrating a HUD in accordance with the present disclosure.
Figure 8B:
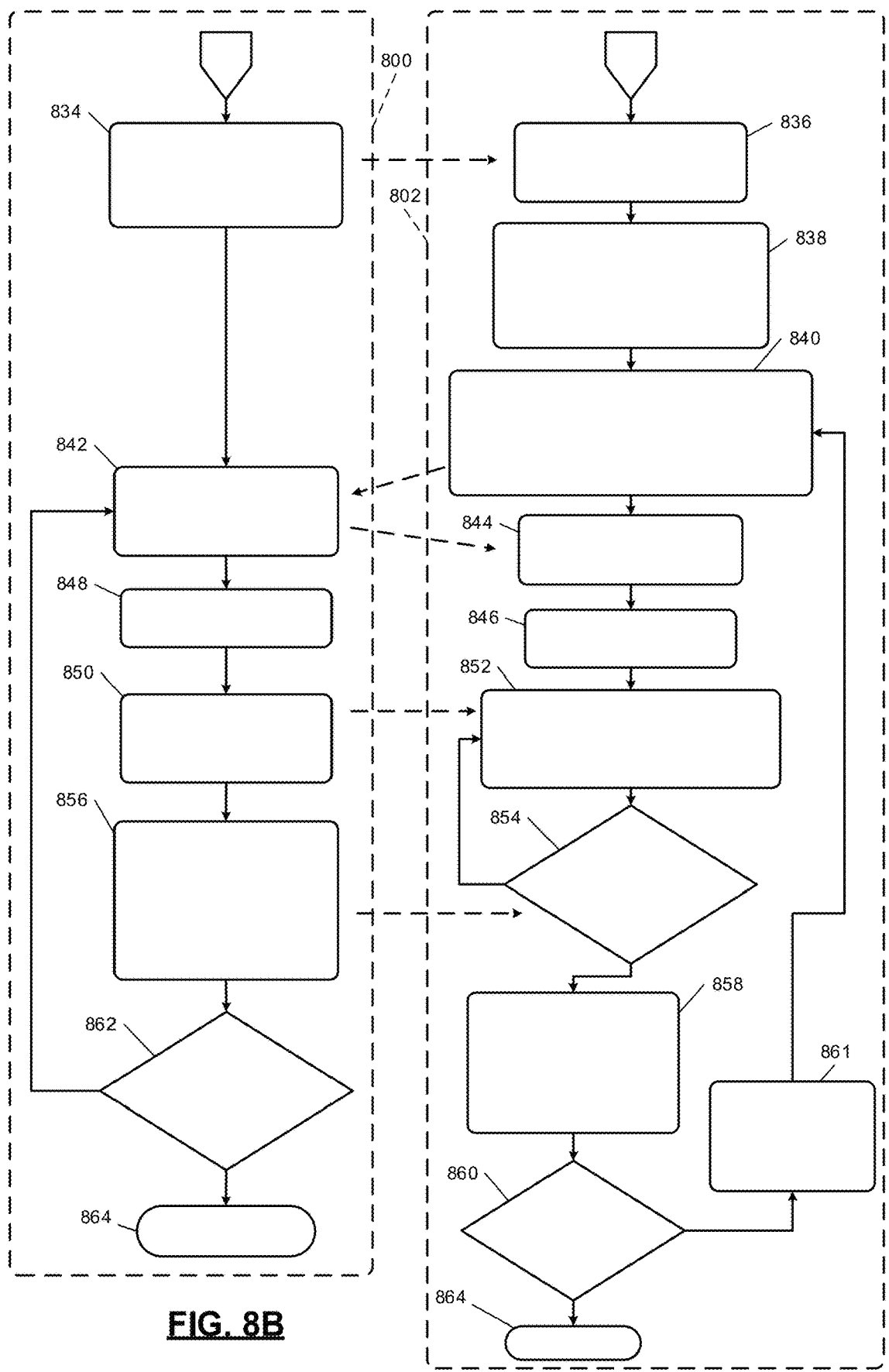

FIG. 5 shows a tri-reticle reference object 500 that may be used during the calibration process of FIGS. 8A-8B. The tri-reticle reference object 500 includes three reticles formed by four cross-hair lines 501, 503, 505, 507. One of the lines 501, referred to as the intersecting line because it is the only line that intersects and crosses through centers of the other three lines 503, 505, 507 to provide three cross-hairs. The cross-hairs include a high, middle (or nominal), and low cross-hairs. The cross-hairs provide, respectively, high, middle and low undistortion calibrations points. The three cross-hairs have center points 502, 504, 506. In the example, the tri-reticle reference object 500 is rectangular-shaped with rounded corners. The shape of the tri-reticle reference object 500 may be different than shown. The tri-reticle reference object 500 is positioned on a windshield, such that the intersecting line extends in a direction from a bottom of the windshield towards a top of the windshield.

FIG. 6 shows an environment of the vehicle 201 of FIG. 2 illustrating relationships between a far virtual image 600, a target 602, a reticle reference object 604 and a volume 606 within which an eyebox may be located (referred to as the eyebox volume). An example of the reticle reference object 604 is shown in FIG. 5 as the tri-reticle reference object 500. During the below calibration process, two viewpoints are established along a ray of light. The first viewpoint refers to alignment of a center of a reticle with a center of a target (e.g., the target 602). This target is positioned with respect to the vehicle in the design location for where the virtual image should be at a specified distance from the vehicle using existing techniques. The second viewpoint refers to alignment of a center of a far virtual image, such as the image 600, relative to a center of the target and as a result relative to a position and/or attitude of the corresponding vehicle. When this alignment is completed a line 610 passes through a center feature 612 of the far virtual image 600, a center feature 614 of the target 602, and a cross-hair of the reticle reference object 604 (e.g., the center point of the middle cross-hair of the tri-reticle reference object 500) to a location within the eyebox (e.g., the middle circle 420 of FIG. 4). The far virtual image 600 includes features 620 surrounding the center feature 612, which are aligned with features 622 of the target 602 that are surrounding the center feature 614. The far virtual image 600 is located behind the target, but to the viewer appears superimposed on and/or overlapping the target, as represented by the far virtual image 600' in FIG. 6.

Figure 7A:
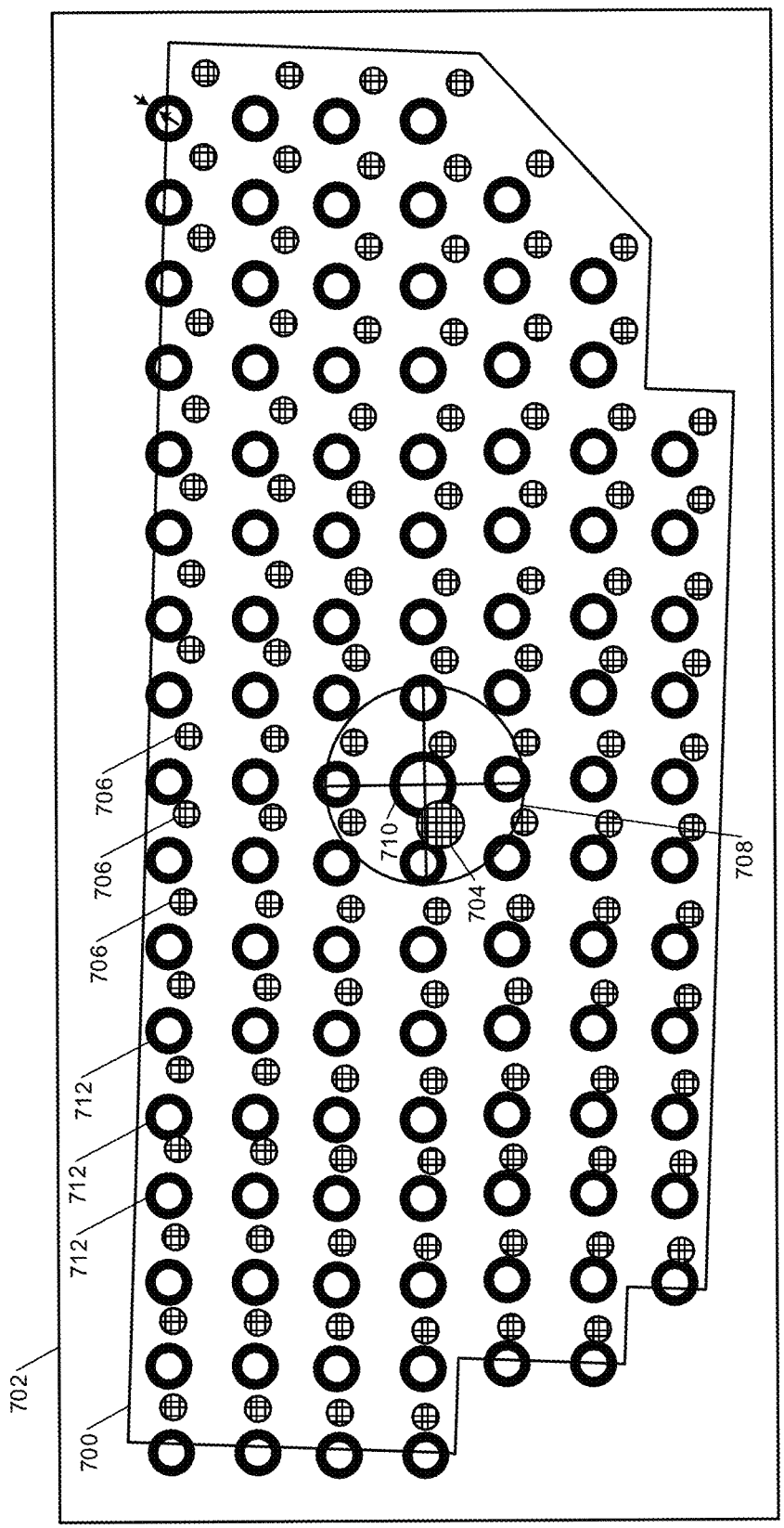
FIG. 7A is a front view of a far virtual image superimposed on, distorted and misaligned with a target in accordance with the present disclosure.
Figure 7B:
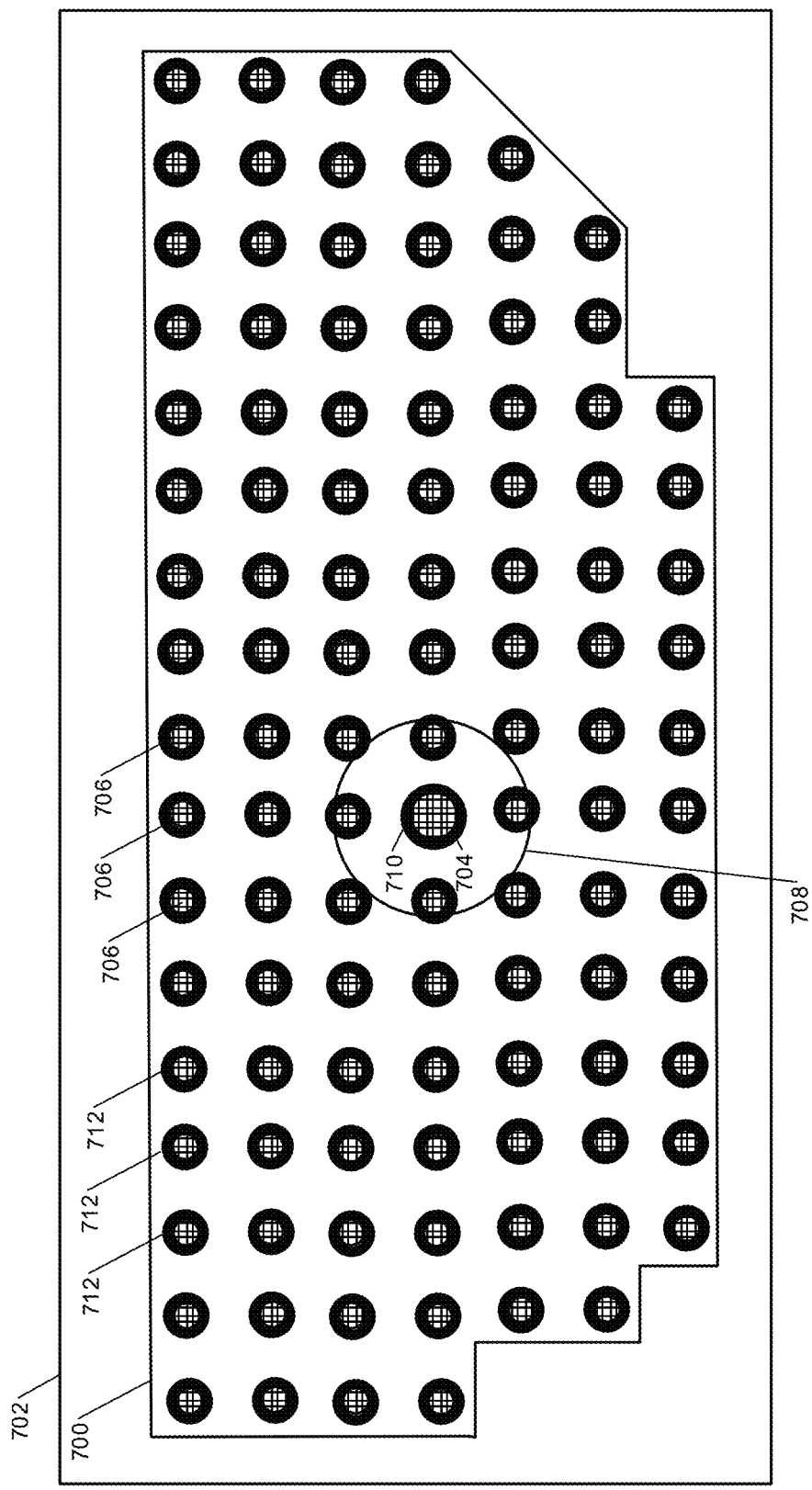
FIG. 7B is a front view of the far virtual image of FIG. 7A superimposed on, aligned and undistorted relative to the target as a result of performing the calibration process of FIGS. 8A and 8B.

FIG. 7A shows a far virtual image 700 superimposed on, distorted and not aligned with a target 702. The far virtual image 700 includes a center feature 704 and surrounding features 706 (only some of which are designated 706 in FIGS. 7A and 7B). A reticle 708 is shown centered and thus concentric with the center feature 710 of the target 702. The target 702 includes a center feature 710 surrounded by features 712 (only some of which are designated 712 in FIGS. 7A-7B). During the below calibration process, the far virtual image 700 is aligned and undistorted relative to the target, such that the features 704, 706 are in the features 710, 712, as shown in FIG. 7B. The far virtual image 700 may be moved vertically and/or horizontally (or laterally), rotated, and/or sized to be aligned with and undistorted relative to the target 702. The far virtual image 700 is centered, scaled and dewarped. In FIG. 7B, the far virtual image 700 is shown as being superimposed on, aligned with and undistorted relative to the target 702, as a result of performing the calibration process of FIGS. 8A and 8B.

In one embodiment, the features 712 are rings having a thickness (one thickness T is shown in FIG. 7A) with an inner diameter and an outer diameter. The bands between inner and outer diameters of the rings refer to respective tolerance areas. During alignment, rotation, undistortion of the far virtual image 700, the features 706, which may be circles, as shown, are moved into respective ones of the features 712. The features 706 may be centered in the features 712 or may overlap the features 712, such that the features 706 are at least within the outer diameters (or peripheries) of the features 712. The thicknesses (or bands) of the features 712 provide a tolerance range for when the features 706 are not precisely centered (or concentrically placed) within the features 712. In one embodiment, the features 706 are solid green circles (or dots) and the features 712 are red circular rings.

FIGS. 8A and 8B show the calibration method for calibrating a HUD (e.g., the HUD 204 of FIG. 2). The following tasks and operations may be iteratively performed and include tasks 800 performed by a technician (or user) and operations 802 performed by, for example, the service tool 224, the vehicle control module 206 and/or the HUD control module 314 of FIG. 2. Although the operations 802 are described as primarily being performed by the vehicle control module 206 and/or the HUD control module 314, one or more of the operations 802 may be performed by the service tool 224 and/or a combination thereof. Inputs from the technician may be received via the service tool 224 and/or any of the other above-described input devices of FIG. 2, such as devices 232, 236, 240, 242, 244.

The method may begin at 804. At 806, the technician aligns the vehicle 201 in a service bay. At 808, the technician starts the vehicle and allows the vehicle to settle at a ride height. In one embodiment, step 808 is not performed and/or performed subsequent to step 810.

At 810, the technician attaches reticle reference object (e.g., the tri-reticle reference object 500 of FIG. 5) in a precise location on the windshield 302. In one embodiment, the reticle reference object is printed on a transparent sheet (referred to as a boresight applique), which is attached to the windshield. The applique of the reticle reference object may be placed over the windshield with fixturing tabs that precisely locate the reticle reference object with respect to an outer periphery of the windshield and/or vehicle body opening of the windshield. The reticle reference object is attached in a predetermined location of the windshield relative to a perimeter of the windshield and/or reference points around the windshield, such as on a frame, A-pillars and/or other fixed structure of the vehicle 201. The geometry of the reticle reference object is predetermined for the particular vehicle for which the stated method is being performed. A center point of a cross-hair of the reticle reference object is used to establish a line of sight from inside the vehicle to a specific feature on a target. This establishes a ray of light for precisely determining locations in an eyebox where eyes of the user (or technician) are to remain while evaluating the relationship between target graphics and a virtual test image having a test pattern, as further described below.

At 812, the technician positions a target in a precise location forward of the vehicle 201, if not already in place. The target is at a predetermined fixed location relative to the windshield that is aligned to the vehicle using existing techniques. Example targets are shown in FIGS. 4, 6, 7A and 7B. The target may be or scaled to be placed at different distances from the vehicle. As an example, the size of the target may be reduced if placed closer to the vehicle. As another example, the target may be positioned 4 meters (m) forward of the vehicle. This allows for the calibration to be performed within a small area and thus within a service bay or driveway.

At 814, the technician may connect the service tool 224 to the diagnostic interface connector 226 of the vehicle 201. At 816, the technician initiates execution of HUD calibration code for calibration process. This may include starting a HUD calibration program on the service tool 224 and/or execution of a HUD calibration program by the vehicle control module. The service tool 224 may be in communication with one or more of the control modules 206, 314 and initiate calibration software on one or more of the control modules 206, 314.

At 818, the vehicle control module 206 receives inputs to initiate a HUD calibration process performed by the control modules 206, 314 and starts the process. At 820, the vehicle control module 206 generates a signal and/or opens a screen on a display to instruct the technician to perform boresighting and align a middle (or nominal) reticle cross-hair with a center of a center feature of the target. The graphics of the target may include high contrast circles that correspond to an array of dots in the far virtual (test) image to be displayed. In one embodiment, the geometry and size of the target circles are slightly larger than the virtual image dots and are designed to indicate allowable lateral and vertical (x, z) displacement tolerance that each dot is permitted to be within to satisfy display quality limits.

At 822, the technician, in order to align the nominal reticle cross-hair (or boresight), adjusts eye locations of the technician such that when looking at the nominal reticle crosshair while sitting in the driver seat, the technician sees the center of the nominal reticle cross-hair in the center of the center feature of the target. This may include the technician adjusting his or her posture, head position, driver set position, etc. When this alignment is completed, the technician provides an input indicating alignment completed.

At 824, the vehicle control module 206 receives the input indicating boresight aligned with center feature of target. When the center of the target is aligned and sighted through the reticle cross-hair, then a ray of light is established into the vehicle and a correct viewing position from which to evaluate the far virtual image is established based on the design parameters of the HUD system.

At 826, the vehicle control module displays the far virtual image for alignment with the target. The far virtual image may be one of the images 600, 700 of FIGS. 6-7B. In one embodiment, the plane of the far virtual image is approximated closer to the vehicle and the display source (or HUD 204), which further allows the calibration method to be performed in a small area.

At 828, the vehicle control module 206 (*i*) instructs the technician to align the center of the reticle cross-hair, the center feature of the target, and a center feature of the far virtual image, and (ii) displays an alignment interface screen. The alignment interface screen may be displayed on the display 236, on a display of the service tool 224, or on another display. The alignment interface screen may be a window with buttons to tap on to select left, right, up, and down directions. In one embodiment, an alignment interface screen is not displayed, but rather the technician provides left, right, up and down inputs via buttons, switches, a dial, and/or other input devices within the vehicle.

At 830, the technician provides inputs to move the far virtual image to align the center of the nominal reticle cross-hair with the center of the center feature of the target and with the center feature of the far virtual image. This is an iterative process to shift the far virtual image in a direction to correct differences in location of the far virtual image relative to the target. At 832, the vehicle control module 206 receives inputs to move the far virtual image and moves the far virtual image accordingly. Although the above-described steps and operations are performed for the nominal reticle cross-hair, the steps and operations may be performed for the high or low reticles cross-hairs. In one embodiment, the above-described alignment is performed for the nominal reticle cross-hair since it is centrally located, corresponds to the nominal eye height position, and provides improved calibration results.

At 834, the technician provides an input indicating that alignment of the center feature of the far virtual image is completed. In one embodiment, the vehicle control module indicates to the technician to maintain the same gaze position while performing the following undistortion calibration for the same and/or nominal eye height associated with boresighting. At 836, the vehicle control module 206 receives the input generated at 834. At 838, the vehicle control module 206 in response to the input generated at 834 determines and sets a virtual coordinate of the center of the far virtual image (and/or other stored data values for the center of the far virtual image) as reference calibration values relative to the center of the corresponding reticle cross-hair and/or a height of the technician's eyes while seated in the driver seat. This may be based on known locations of the reticle cross-hair and the center feature of the target. The location of the center of the reticle cross-hair is pre-known location relative to the windshield. The location of the target is a pre-known location relative to the vehicle. The eye height may be determined via the DMS 208.

At 840, the vehicle control module 206 instructs the technician to select one of three undistortion calibrations (high, middle (or nominal), and low) and adjust eye height for the selected undistortion calibration. In one embodiment, if this is the first undistortion calibration, the vehicle control module 206 indicates to the technician that all three undistortion calibrations (high, middle (or nominal), and low) need to be performed to fully complete the calibration process. In one embodiment, the vehicle control module 206 instructs the technician to perform the middle undistortion calibration followed by the high undistortion calibration and finally the low undistortion calibration. In another embodiment, the vehicle control module 206 instructs the technician to perform the high undistortion calibration followed by the middle and then the low undistortion calibration. Operations 840-862 may not be performed if the features of the test image are aligned and centered within the respective features of the target. For example, if the green dots of the far virtual image are aligned with and thus within the outer diameters of the red circles of the target, then the three undistortion calibrations may be skipped.

At 842, the technician selects one of the undistortion calibrations to perform. This may be done by tapping a button on a display. At 844, the vehicle control module 206 receives an input indicating the selected one of the undistortion calibrations.

At 846, the vehicle control module 206 may display the alignment interface screen to allow for rotation and/or sizing adjustment of the far virtual image. The alignment interface screen may include buttons to tap on to rotate clockwise, rotate counterclockwise, expand, contract, etc. the far virtual image. In one embodiment, the alignment interface screen is not displayed and inputs are provided via other input devices. The technician evaluates the displayed far virtual image relative to the target including the locations of features of the far virtual image relative to features of the target. The technician maintains his or her gaze angle such that the corresponding cross-hair is centered on the target and interacts with the virtual image display system via one of the stated input devices to perform the stated adjustments.

At 848, the technician adjusts height of the technician's eyes, as described above. This may include adjusting posture, head position, seat position etc. At 850, the technician provides inputs to rotate and/or undistort the far virtual image. This is an iterative process and is done relative to the features on the target. The features of the far virtual image are moved to be centered in respective features of the target. In one embodiment, the vehicle control module 206 also allows the technician to adjust a brightness level of the far virtual image. The vehicle control module 206 may display brightness tabs that allows the technician to set the brightness of the far virtual image. The set brightness level may also be recorded and used as a basis for displaying other far virtual images. At 852, the vehicle control module 206 receives the inputs to rotate and/or undistort (or dewarp) the far virtual image and rotates, expands, and/or contracts the far virtual image including adjusting locations of features of the far virtual image based on the received inputs from the technician.

At 854, the vehicle control module 206 determines whether an input has been received indicting that the current undistortion calibration is complete. If yes, operation 858 is performed, otherwise the vehicle control module 206 continues to receive inputs from the technician at 852. At 856, the technician may evaluate distortion over a complete FOV by confirming that all far virtual image features (e.g., green dots) are within respective target circles. This confirmation is indicated by providing an input indicating the alignment and undistortion of the far virtual image for the currently selected undistortion calibration is completed. Test image dots that are out of tolerance limits of the target circles when the far virtual image is properly centered and rotated indicates that the undistortion calibration is not completed.

At 858, the vehicle control module 206 sets coordinates of the features of the far virtual image (and/or other store data values for each of the features) as reference calibration values for the corresponding center of the reticle cross-hair and/or the height of the technician's eyes. This may be based on known locations of the reticle cross-hair and locations of the features of the target. The vehicle control module 206 may generate correction parameters based on the reference values determined at 838 and 858 for adjusting displayed locations of far virtual images and corresponding features for each of the high, middle and low locations. The correction parameters may include x and z distance correction values, rotation angle differences, and/or other parameters for correcting locations of the far virtual images and/or the features of the far virtual images. The correction parameters may be stored in the memory 260.

At 860, the vehicle control module 206 determines whether another undistortion calibration is to be performed. If yes, the vehicle control module may generate a signal and/or display an indicator indicating to the technician to perform the next undistortion calibration at 861 followed by returning to operation 840. If another undistortion calibration is not to be performed, the method may end at 864.

At 862, the technician determines if another undistortion calibration is to be performed. This may be based on whether an indication is received by the vehicle control module 206. If another undistortion calibration is to be performed, the technician returns to task 842 to select a next one of the undistortion calibrations to perform, such as the high or low undistortion calibration. If another undistortion calibration is not to be performed, the technician may close out the calibration process and thus cease performing calibration, as indicated by step 864.

The above-described operations are meant to be illustrative examples. The operations may be performed sequentially, synchronously, simultaneously, continuously, during overlapping time periods or in a different order depending upon the application. Also, any of the operations may not be performed or skipped depending on the implementation and/or sequence of events.

Referring again to FIGS. 2-3 and subsequent to performing the above-described calibration process, operation of the head-up display 204, including operation of the far image generating module 312 and far image transfer and modification devices 323, are adjusted based on the set reference values determined at 838 and 858 and/or the above-stated correction parameters. Far virtual images may be generated and located based on the set reference values. A center location of displayed virtual image graphics may be determined based on the set reference values and subsequently the graphics may be displayed based on this center location. As an example, the vehicle control module 206 and/or the HUD control module 314 may obtain eye height and/or location information determined by the DMS module 212. Based on the reference values, the eye height and/or location information, and environmental information, determine where in a FOV to display far virtual images. If a driver's eyes are not at one of the high, nominal, and low locations, the vehicle control module 206 and/or the HUD control module 314 may perform interpolation between sets of references and/or correction values associated, respectively, with the high, nominal and/or low locations to determine locations to display the far virtual images and corresponding features. The HUD 204 may compensate for changed eye locations and curvature of the windshield by adjusting displayed locations of far virtual images based on the stated information.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A head-up display calibration system comprising:
   a head-up display configured to display a first virtual image, the first virtual image comprising a first center feature and a first plurality of features surrounding the first center feature;
   a reticle reference object physically fixed to a windshield of a vehicle;
   a target physically disposed forward of the vehicle and comprising a second center feature and a second plurality of features surrounding the second center feature; and
   a control module configured to
      control the head-up display to display the first virtual image superimposed over the target as viewed from a driver seat of the vehicle,
      perform a boresighting process to align a center of a first cross-hair of the reticle reference object with the first center feature and the second center feature and generate first reference values,
      perform at least one undistortion calibration process to rotate and undistort the first virtual image relative to the target, such that the second plurality of features are positioned over respective ones of the first plurality of features and generate second reference values, and
      adjust operation of the head-up display based on the first reference values and the second reference values.

2. The head-up display calibration system of claim 1, wherein the control module is configured to:
   generate a signal to indicate to a user of the head-up display calibration system to adjust location of eyes of the user to align the center of the first cross-hair of the reticle reference object with the second center feature of the target; and
   receive inputs indicating the center of the first cross-hair of the reticle reference object is aligned with the second center feature of the target.

3. The head-up display calibration system of claim 2, wherein the control module is configured to:
   receive inputs to move the first virtual image relative to the target;
   receive an input indicating the center of the first cross-hair of the reticle reference object is aligned with the second center feature of the target and the first center feature of the first virtual image; and
   set the first reference values based on a last location of the first virtual image.

4. The head-up display calibration system of claim 1, wherein the control module is configured to:
  receive inputs to rotate and adjust size of first virtual image;
  rotate and adjust size of first virtual inputs based on the inputs relative to target; and
  set the second reference values based on resultant locations of the second plurality of features relative to the first plurality of features.

5. The head-up display calibration system of claim 1, wherein:
  the reticle reference object comprises a plurality of cross-hairs respectively for a plurality of undistortion calibrations and corresponding gaze perspectives;
  the plurality of cross-hairs include the first cross-hair; and
  the control module is configured to perform the plurality of undistortion calibrations to generate the second reference values.

6. The head-up display calibration system of claim 1, wherein the control module is configured to:
  generate a signal indicating performance of three undistortion calibrations for high, middle and low eye height locations within an eyebox;
  receive inputs to adjust the first virtual image relative to the target for each of the three undistortion calibrations; and
  set the second reference values based on results of the three undistortion calibrations.

7. The head-up display calibration system of claim 6, wherein the control module is configured to during each of the three undistortion calibrations at least one of rotate and/or adjust size of the first virtual image.

8. The head-up display calibration system of claim 1, wherein:
  the head-up display is configured to display a second virtual image;
  the second virtual image displayed closer to the vehicle than the first virtual image;
  the first virtual image is displayed over and in alignment with one or more objects in a field of view of a driver of the vehicle; and
  the second virtual image is not displayed in alignment with an object in the field of view.

9. A virtual image display system comprising:
  the head-up display calibration system of claim 1;
  a driver monitoring system configured to determine at least one of a height or location of an eye of a driver; and
  an inertial measurement module configured to generate an output signal,
  wherein the control module is configured to display a second virtual image based on the first reference values the second reference values, at least one of the height or the location of a driver eye, and the output signal from the inertial measurement module.

10. The virtual image display system of claim 9, wherein the control module is configured to:
  determine a location of an object forward of the vehicle; and
  based on the first reference values and the second reference values, display a second virtual image over and in alignment with the object.

11. A head-up display calibration method comprising:
  obtaining location data for a reticle reference object physically fixed to a windshield of a vehicle;
  obtaining location data for a target physically disposed forward of the vehicle and comprising a first center feature and a first plurality of features surrounding the first center feature;
  controlling a head-up display of the vehicle to display a first virtual image superimposed over the target as viewed from a driver seat of the vehicle, the first virtual image comprising a second center feature and a second plurality of features surrounding the second center feature;
  performing a boresighting process to align a center of a first cross-hair of the reticle reference object with the first center feature and the second center feature and generate first reference values;
  performing at least one undistortion calibration process to rotate and undistort the first virtual image relative to the target, such that the second plurality of features are positioned over respective ones of the first plurality of features and generate second reference values; and
  adjusting operation of the head-up display based on the first reference values and the second reference values.

12. The method of claim 11, further comprising:
  generating a signal to indicate to a user of a head-up display calibration system to adjust location of eyes of the user to align the center of the first cross-hair of the reticle reference object with the first center feature of the target; and
  receiving inputs indicating the center of the first cross-hair of the reticle reference object is aligned with the first center feature of the target.

13. The method of claim 12, further comprising:
  receiving inputs to move the first virtual image relative to the target;
  receiving an input indicating the center of the first cross-hair of the reticle reference object is aligned with the first center feature of the target and the second center feature of the first virtual image; and
  setting the first reference values based on a last location of the first virtual image.

14. The method of claim 11, further comprising:
  receiving inputs to rotate and adjust size of first virtual image;
  rotating and adjusting size of first virtual inputs based on the inputs relative to target; and
  setting the second reference values based on resultant locations of the second plurality of features relative to the first plurality of features.

15. The method of claim 11, further comprising performing three undistortion calibrations to generate the second reference values,
  wherein the reticle reference object comprises three cross-hairs respectively for the three undistortion calibrations.

16. The method of claim 11, further comprising:
  generating a signal indicating performance of three undistortion calibrations for high, middle and low eye height locations within an eyebox;
  receiving inputs to adjust the first virtual image relative to the target for each of the three undistortion calibrations; and
  setting the second reference values based on results of the three undistortion calibrations.

17. The method of claim 16, further comprising during each of the three undistortion calibrations at least one of rotating and/or adjusting size of the first virtual image.

18. The method of claim 11, further comprising displaying a second virtual image on the head-up display closer to the vehicle than the first virtual image, wherein:
- the first virtual image is displayed over and in alignment with one or more objects in a field of view of a driver of the vehicle; and
- the second virtual image is not displayed in alignment with an object in the field of view.

19. The method of claim 11, further comprising:
determining at least one of a height or location of an eye of a driver;
generating via an inertial measurement module an output signal; and
displaying a second virtual image based on the first reference values the second reference values, at least one of the height or the location of a driver eye, and the output signal from the inertial measurement module.

20. The method of claim 19, further comprising:
determining a location of an object forward of the vehicle; and
based on the first reference values and the second reference values, displaying a second virtual image over and in alignment with the object.

* * * * *